tion Serial No. 142,978 filed October 4, 1961, now abandoned, and assigned to the same assignee as the present application.

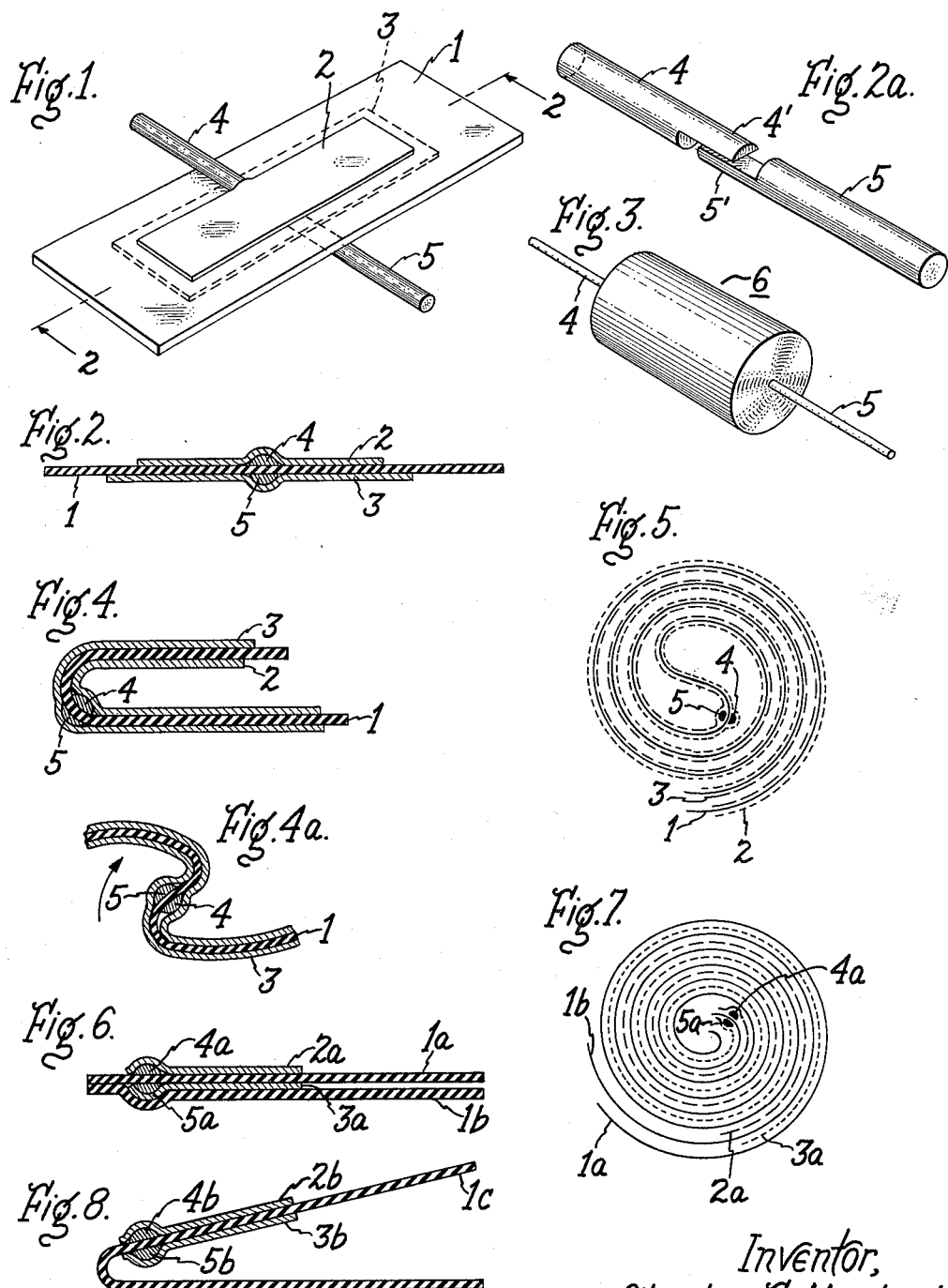

United States Patent Office 3,229,174
Patented Jan. 11, 1966

3,229,174
ROLLED CAPACITOR AND TERMINAL
CONNECTION THEREFOR
Theodore E. Marchewka, Glens Falls, N.Y., assignor to General Electric Company, a corporation of New York
Filed Oct. 23, 1962, Ser. No. 232,389
2 Claims. (Cl. 317—260)

This application is a continuation-in-part of application Serial No. 142,978 filed October 4, 1961, now abandoned, and assigned to the same assignee as the present application.

The present invention relates to electrical capacitors, and more particularly concerns small, low capacity wound capacitors and to a method of making such capacitors.

Conventional winding apparatus which is usually employed in large scale commercial manufacture of wound dielectric types of electrical capacitors are not practical for winding small capacitors of low capacitance values, e.g., of the order of less than 1,000 micromicrofarads (mmf.) and which require an effective foil area of the order of ¼ square inch. Such winding machines are not adapted for the very close control and accurate alignment which such capacitors require and, in fact, cannot readily handle the short lengths of foil which these capacitors entail. Because of such difficulties, it has generally been the practice heretofore to employ flat ceramic capacitors for capacitance values below 1,000 mmf. However, ceramic capacitors are not characterized by as stable electrical properties as wound film type capacitors, and have other disadvantages as compared to the latter.

It is an object of the invention to provide wound electrical capacitors of low capacitance values which avoid the above-mentioned disadvantages, and to provide an improved method of making the same.

It is another object of the invention to provide electrical capacitance of the above type which may be readily wound into a compact roll about its leads serving as the winding mandrel.

Other objects and advantages will become apparent from the following description taken in conjunction with the appended claims.

With the above objects in view, the present invention relates to an electrical capacitor having a low capacitance value in the range of 1 to 1,000 mmf. comprising a strip of dielectric material having adhesive material, preferably of the pressure-sensitive type, on its opposite surfaces, a pair of foil strips respectively superposed on and adhesively secured to the opposite surfaces of the strip of dielectric material, and a pair of conducting leads respectively electrically connected to the foil strips and projecting laterally in opposite directions beyond the edges of the dielectric strip, the superposed adhesively attached assembly of dielectric and foil strips being wound into a roll about the conducting leads, and the latter members serving both as the winding mandrel and the terminal electrode leads for the capacitor. The conducting lead members therefore form a composite core of the rolled assembly extending through the axis thereof.

In a preferred form of the invention, the foil strips are aluminum and are laterally offset in opposite directions beyond the side edges of the dielectric material, which is polyethylene terephthalate, so as to provide foil portions exposed at opposite ends of the wound roll, the conducting leads being in electrical contact with the thus exposed portions of the respective foil strips. The projecting portions of the foil strip electrodes are bent into contact with the conducting lead members.

The invention will be better understood from the following description taken in conjunction with the accompanying drawings, in which:

FIGURE 1 is a perspective view of a capacitor assembly prior to winding in accordance with an embodiment of the invention;

FIGURE 2 is a sectional view of the FIGURE 1 assembly taken along the line 2—2 in FIGURE 1;

FIGURE 2a is an enlarged detail view of the conducting leads arranged in accordance with the invention;

FIGURE 3 is a perspective view of the FIGURE 1 capacitor assembly after being wound into roll form;

FIGURES 4 and 4a show alternative methods of winding the assembly shown in FIGURES 1 and 2;

FIGURE 5 is a diagrammatic end view of the FIGURE 3 capacitor;

FIGURE 6 is a sectional view similar to that of FIGURE 2 showing a modified form of capacitor assembly prior to winding;

FIGURE 7 is a diagrammatic end view of the FIGURE 6 capacitor assembly after winding;

FIGURE 8 shows still another embodiment of a capacitor assembly prior to winding;

Figure 9:
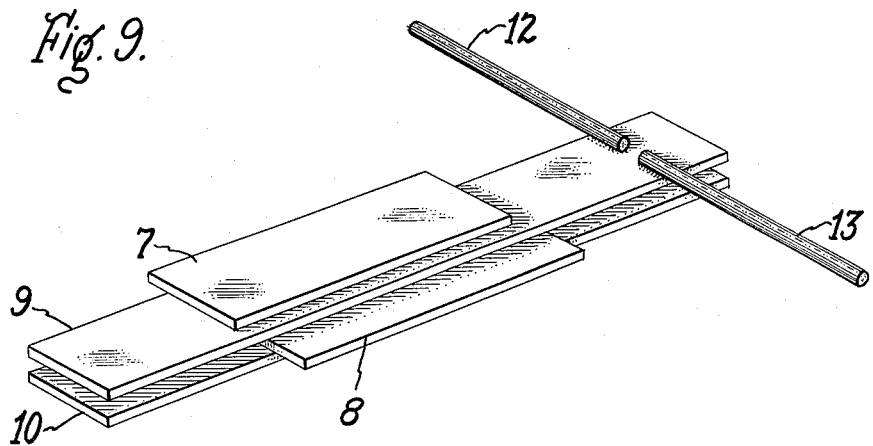
FIGURE 9 shows still a further embodiment of a capacitor assembly prior to winding.

Referring now to the drawing, and particularly to FIGURE 1, there is shown an embodiment of the invention comprising a dielectric strip 1 composed of a suitable electrical insulating material having on opposite surfaces a coating of adhesive of any suitable composition and preferably of tacky or pressure-sensitive type. Dielectric strip 1 is preferably composed of a synthetic resin film such as polyethylene terephthalate, polytetrafluoroethylene, vinyl compounds, polyesters, polyamides, or other suitable plastic insulating materials well-known in the art. However, the invention is not limited to such materials, since other known dielectrics may be satisfactorily employed in certain cases, such as kraft paper and other cellulosic material. Polyethylene terephthalate (Mylar) strip material having pressure-sensitive adhesive surfaces is commercially available and has been found satisfactory for use in the invention. However, adhesive coatings of various known types which are normally tacky and pressure-sensitive may be applied to various types of the above-described materials with which they are compatible.

Adhesively secured to opposite surfaces of dielectric strip 1 are electrode foil strips 2 and 3 of any suitable conducting electrode material such as aluminum. In the illustrated embodiment, foil 2 is accurately dimensioned to provide the desired capacitance value of the final capacitor, and foil 3 is made of somewhat larger size and arranged so as to overlap foil 2 on all sides as shown by the dotted lines. The dimensions of dielectric strip 1 are sufficiently large to provide a substantial insulating margin separating foil electrodes 2 and 3 along their edges in the wound roll. As will be understood, the thicknesses of the component parts of the capacitor illustrated have been exaggerated for the purposes of clarity, and are not necessarily drawn to scale. Conducting leads 4 and 5 of any suitable conducting material such as copper wire are respectively secured, such as by welding, soldering or conducting adhesives or resins, to electrode foils 2 and 3 with the leads aligned longitudinally with each other and projecting in opposite directions laterally beyond the longitudinal edges of dielectric strip 1.

Preferably, leads 4 and 5 are secured to the inner faces of their respective foil electrodes, since by this arrangement they are more strongly secured to the strip assembly due to their contact with the adhesive material, and are accordingly more resistant to the stresses resulting from the rolling procedure as hereinafter described.

As shown in FIGURE 2a, leads 4 and 5 are, in preferred form, round wires which are cut away or mechanically formed in their portions 4′, 5′ which lie within the capacitor assembly so as to have a semi-circular cross section in those portions, such that when these portions are arranged in overlapping alignment, they are complementary to one another in the manner indicated in FIGURE 2a to form an approximately circular core. They are accordingly well-adapted for their function as a mandrel for supporting and forming a compact roll during winding. As will be understood, the dielectric and foil components have been omitted in FIGURE 2a for clarity.

In forming a wound roll 6 of the FIGURE 1 assembly as shown in FIGURE 3, the winding can be commenced in two ways, as alternatively illustrated in FIGURES 4 and 4a. In the method indicated in FIGURE 4, the left end of the assembly is folded over with leads 4, 5 at the bend portion, and the thus folded strip assembly is then rolled around leads 4, 5 serving in combination as the winding mandrel. In the alternative method shown in FIGURE 4a, the strip assembly in the condition shown in FIGURE 2 is twisted about leads 4, 5 by rotating the latter about their common axis as indicated by the arrow, and such rotation is continued until the entire strip assembly is rolled up. In either case, the rolled capacitor assembly will have an arrangement substantially as illustrated in the diagrammatic view of FIGURE 5. Such initial folding or twisting of the ends of the strip assembly about leads 4, 5 avoids a short circuit between foils 2 and 3 which would occur if the assembly were simply rolled up from the end.

FIGURE 6 shows a modified form of strip assembly which differs from that of FIGURES 1 and 2 in that an additional dielectric strip 1b which similarly to strip 1 may be provided, although not necessarily, with pressure sensitive adhesive material on opposite surfaces, is adhesively attached to foil electrode 3a. In this embodiment leads 4a, 5a are located close to the end of the strip assembly as shown, and in forming the capacitor roll, the assembly is wound up around leads 4a, 5a serving in combination as the winding mandrel. The resulting capacitor roll is diagrammatically illustrated in FIGURE 7.

As will be apparent, when wound as above-described, the FIGURE 6 embodiment provides about twice the total capacitance of the FIGURE 2 device with the same size of foil electrodes, since in the latter construction only one-half of the available surface area of electrode foil 2 is effective due to its being folded or rolled over on itself, whereas in the FIGURE 6 arrangement, the entire surface area of electrode foil 2 is effectively used.

Notwithstanding the necessity to use a greater amount of foil in the FIGURE 2 device to obtain a capacitance equivalent to that of the FIGURE 6 construction, the former construction may be preferred as a practical matter in many cases due to the considerably greater unit cost of the adhesive coated resin dielectric sheet as compared to that of the aluminum foil strip, and in view of the considerably greater amount of the dielectric sheet required in the FIGURE 6 embodiment.

With respect to the FIGURE 6 embodiment as shown in the drawing, it will be apparent that dielectric sheets 1a and 1b may be constituted by a single folded dielectric sheet instead of two separate sheets. Such a modified arrangement is shown in FIGURE 8, wherein dielectric sheet 1c is provided between foils 2b and 3b, the assembly being illustrated prior to folding dielectric sheet 1c.

The arrangements above-described are particularly adapted for use in the manufacture of capacitors of miniature type having a capacitance range of 1 to 1000 mmf., and the size of the components of such capacitors are correspondingly small. For example, for a 50 mmf. capacitor, a polyethylene terephthalate dielectric sheet for this capacitor would be about ½ mil thick, ⁵⁄₁₆ inch wide, and ¾ inch long. The size of the effective aluminum foil electrode used in such a capacitor would be about ⅛ inch wide, ½ inch long, and ½ mil thick, while the other foil would be slightly larger in width and length. A typical conducting lead member would be a copper-clad steel wire of .025 inch diameter and 2 inches long.

In a typical process of making a capacitor of the described type, wire leads having the configuration shown in FIGURE 2a are attached to foil strips preferably at the central portions thereof by welding. One of the thus prepared foils is laid on a flat surface with the lead member facing up and a Mylar dielectric film having pressure sensitive adhesive on its surfaces is laid on top of that foil and pressed into firm contact therewith. The second electrode foil is then applied to the opposite surface of the Mylar film in registry with the other foil and with the lead on its inner face and aligned in overlapping relation with the other lead. With the assembly thus firmly adhesively united, the oppositely projecting leads are grasped and rotated so as to form a tight compact roll about the leads serving as the winding mandrel. The thus rolled-up unit is inserted into a prefabricated shell such as glass, ceramic, plastic or metal, or Mylar tape wrap or other covering well-known to the art. In the event a metal case is used, care should be taken to employ a sufficient length of the dielectric film to encompass the entire unit for insulating the same. Otherwise, the roll should be encapsulated in a plastic material, e.g., by conventional molding methods, which could include molding directly around the roll, or casting into a resin.

Figure 10:
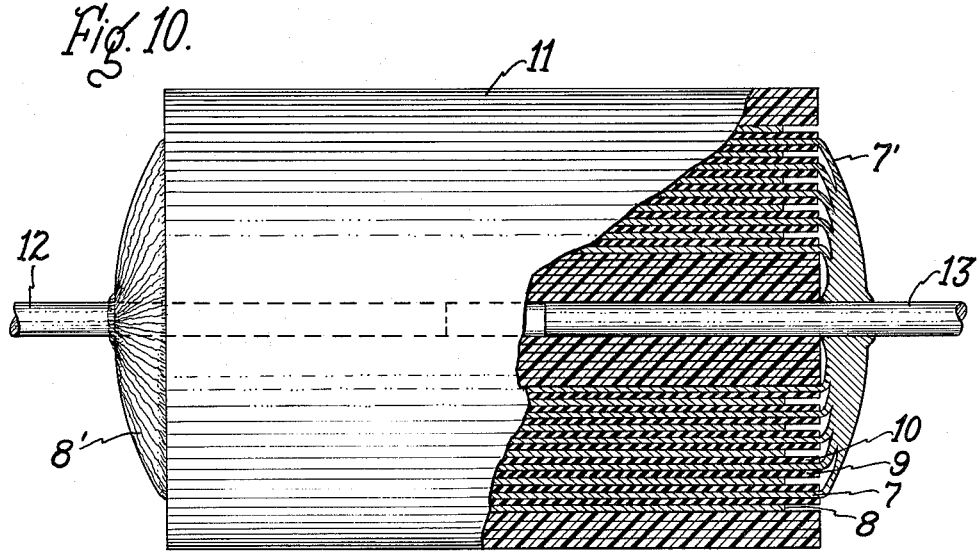
FIGURE 10 is an enlarged view, partly in section, of the FIGURE 9 capacitor assembly after being wound into roll form.

FIGURE 9 shows a particularly preferred embodiment of the invention wherein foil electrodes 7 and 8 are arranged overlying each other in alternating arrangement with dielectric strips 9, 10 such as Mylar which are provided with pressure sensitive adhesive on each of their flat surfaces. Foil electrodes 7 and 8 are arranged in the assembly laterally offset from one another and projecting from opposite sides of dielectric strips 9, 10 so that in the rolled up form, as shown in FIGURE 10, the exposed foil portions 7′, 8′ project from opposite ends of capacitor roll 11. Dielectric strips 9, 10 are sufficiently long to project a substantial distance beyond the opposite end of foil electrodes 7, 8.

On this embodiment, conducting leads 12 and 13 are arranged on the upper dielectric strip 9 near the starting end of the roll assembly in longitudinally aligned and spaced relation and spaced from the foil electrodes in the starting assembly, since in view of the exposed foil arrangement, the leads need not be placed in electrical contact with the foil electrodes inside the roll. In forming the roll, the starting ends of the dielectric strips 9, 10 are initially wrapped around the aligned leads 12, 13 and the latter then serve as a mandrel for winding up the superposed assembly of dielectric and foil strips. In the wound roll (see FIGURE 10) a number of starting turns of dielectric strips 9, 10 separate leads 12, 13 from the electrode foils in the central portion of the roll, while the end turns of dielectric strips 9, 10 provide an outer dielectric covering for the roll. After the roll is wound, exposed foil portions 7′, 8′ are bent or crimped into contact with the respective conducting members or leads 12, 13 projecting from the roll. The exposed foil portions 7′, 8′ are then welded, or otherwise permanently secured, to the leads. In this construction the leads or conducting members 12, 13 form a composite core of the rolled assembly extending through the axis thereof.

There is thus provided in accordance with the invention an extremely simple and economical method of making miniature capacitors of low capacitance value which may have accurately controlled capacitance properties and which are characterized by stable electrical properties.

As will be understood, the invention also includes within its scope other arrangements whereby the metal or foil strips are adhesively coated instead of, or in addition to, the dielectric strips being so coated.

It will also be understood that the wound capacitor rolls described and shown could be further pressed so as to impart an oval or flattened shape thereto, if desired.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A miniature electrical capacitor of low capacitance value in the range of 1 to 1,000 mmf. comprising, in combination, a rolled assembly of a pair of superposed aluminum foil electrodes separated by and adhesively secured to a pair of polyethylene terephthalate dielectric layers, said foil electrodes being offset laterally from one another and projecting from opposite ends of the rolled assembly, and a pair of spaced longitudinally aligned elongated conducting members projecting axially from opposite ends of said rolled assembly and respectively secured in electrical contact with the projecting portions of said foil electrodes, the projecting portions being bent into contact with said conducting members, said conducting members forming a composite core of said rolled assembly extending through the axis thereof.

2. A miniature electrical capacitor of low capacitance value in the range of 1 to 1,000 mmf. comprising, in combination, a rolled assembly of a pair of superposed aluminum foil electrodes separated by an adhesively secured to a pair of polyethylene terephthalate dielectric layers, said dielectric layers extending substantially beyond the opposite ends of said foil electrodes to provide inner and outer dielectric end portions, said foil electrodes being offset laterally from one another and projecting from opposite ends of the rolled assembly, and a pair of spaced longitudinally aligned elongated conducting members arranged with their inner ends on the inner end portion of one of said dielectric layers and spaced from said foil electrodes, and with their outer ends projecting axially from opposite ends of said rolled assembly and respectively secured in electrical contact with the projecting portions of said foil electrodes, the projecting portions being crimped into contact with said conducting members, said conducting members forming a composite core of said rolled assembly extending through the axis thereof.

References Cited by the Examiner
UNITED STATES PATENTS

| | | | |
|---|---|---|---|
| 2,355,788 | 8/1944 | Dunleavey et al. | 317—260 |
| 2,930,714 | 3/1960 | Netherwood | 317—260 |
| 3,061,767 | 10/1962 | Toro | 317—260 |

FOREIGN PATENTS

| | | |
|---|---|---|
| 140,198 | 2/1951 | Australia. |
| 563,407 | 8/1944 | Great Britain. |
| 578,487 | 7/1946 | Great Britain. |
| 578,509 | 7/1946 | Great Britain. |
| 821,418 | 10/1959 | Great Britain. |

JOHN F. BURNS, *Primary Examiner.*
JOHN P. WILDMAN, *Examiner.*